United States Patent [19]

York et al.

[11] 4,053,178

[45] Oct. 11, 1977

[54] PLATFORM - OPERATOR TILTING RESILIENT MOUNTING FOR EARTHMOVING VEHICLES

[75] Inventors: Lyle E. York, Peoria; Dale C. Brinkmann, East Peoria, both of Ill.

[73] Assignee: Caterpillar Tractor Co., Peoria, Ill.

[21] Appl. No.: 614,812

[22] Filed: Sept. 18, 1975

[51] Int. Cl.² .............................................. B62D 27/06
[52] U.S. Cl. ................................ 296/28 C; 180/89.15; 296/35 R
[58] Field of Search ................... 296/102, 28 C, 35 R; 280/756; 214/DIG. 7; 180/89 A, 89.12, 89.13, 89.14, 89.15, 89.16, 89.17, 89.18, 89.19; 188/1 B, 129

[56] References Cited

U.S. PATENT DOCUMENTS

| 1,952,902 | 3/1934 | Barros | 188/129 |
|---|---|---|---|
| 2,565,919 | 8/1951 | Hill | 296/28 C |
| 2,781,102 | 2/1957 | Prichard | 296/28 C |
| 3,036,858 | 5/1962 | Fingerut | 296/102 |
| 3,216,761 | 11/1965 | Domina | 296/102 |
| 3,259,211 | 7/1966 | Ryskamp | 296/102 |
| 3,527,474 | 9/1970 | Boersma | 280/756 |
| 3,572,819 | 3/1971 | Moore | 296/102 |
| 3,578,377 | 5/1971 | Babbitt | 296/102 |
| 3,768,856 | 10/1973 | Stuller | 280/756 |
| 3,791,668 | 2/1974 | Adams | 280/756 |
| 3,847,492 | 11/1974 | Kennicutt | 403/224 |
| 3,875,850 | 4/1975 | Reynolds | 91/468 |

FOREIGN PATENT DOCUMENTS 978,964   1/1965   United Kingdom ............. 296/28 C Primary Examiner—Robert R. Song
Assistant Examiner—John A. Carroll
Attorney, Agent, or Firm—Wegner, Stellman, McCord, Wiles & Wood

[57] ABSTRACT

An operator's cab pivotally mounted to the frame of a tractor employing a screw jack for raising and positively and safely holding the cab in a raised position. When in a lowered operating position, the end of the cab spaced from the pivotal mounting is releasably secured to the frame by a pair of resilient mounting assemblies each including a first connector fixedly attached to the frame, a second connector fixedly attached to the cab, and a coupler having a body resiliently mounted to the first connector by means of a pin and resilient bushing and releasably secured to the second connector by means of a removable connecting pin. The weight of the cab is supported not by the removable connecting pin, but by mating bearing surfaces of the body and the second connector to facilitate removal of the pin. An upwardly projecting sloped surface of the first connector guides the body into supportive engagement with the mating surface thereof.

10 Claims, 7 Drawing Figures

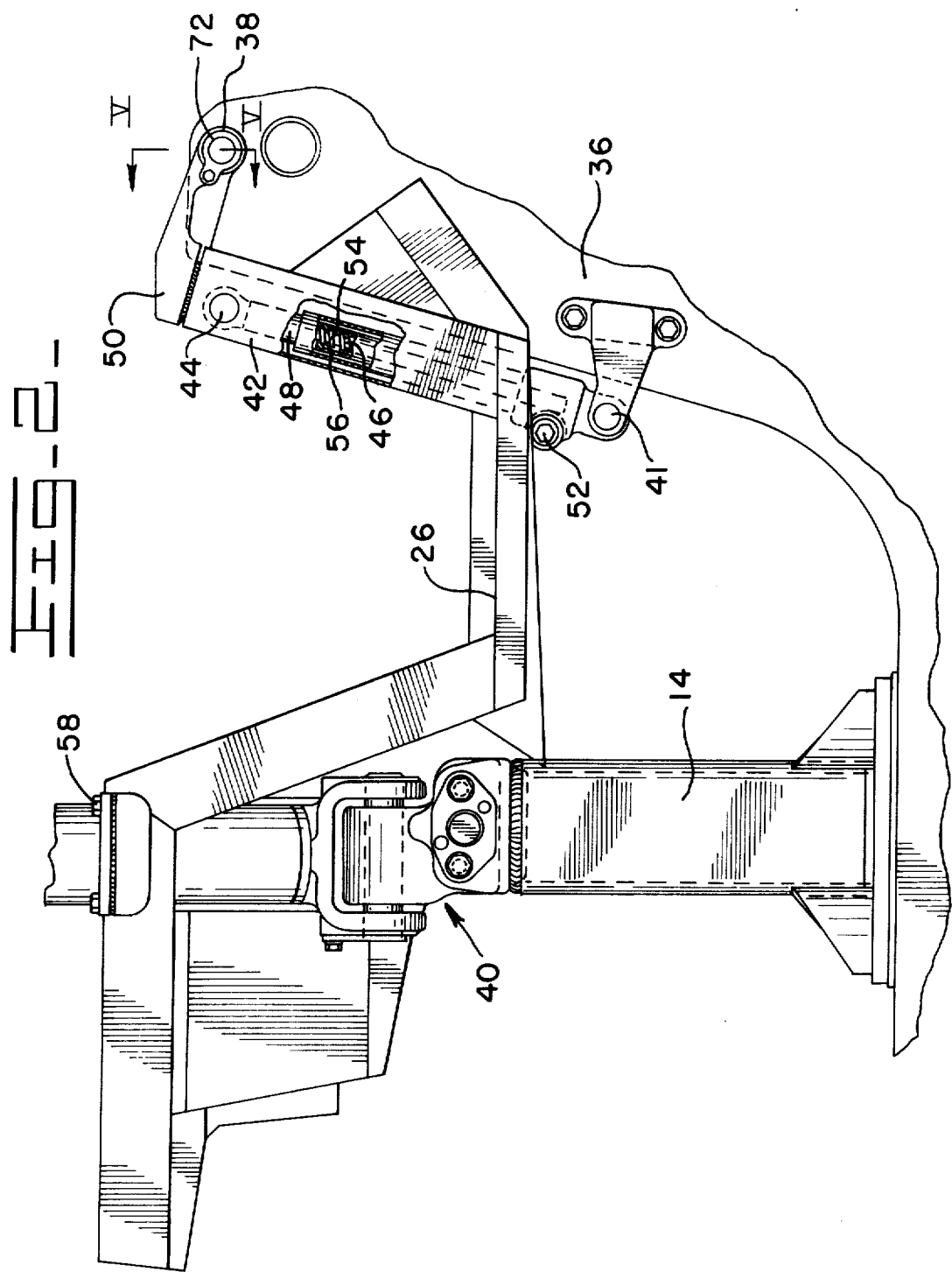

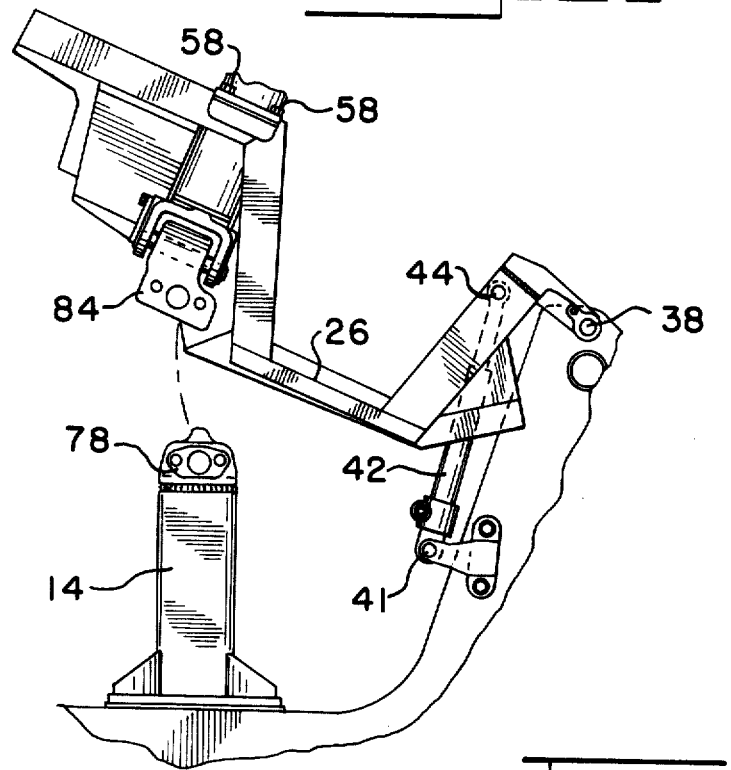
Fig_3_
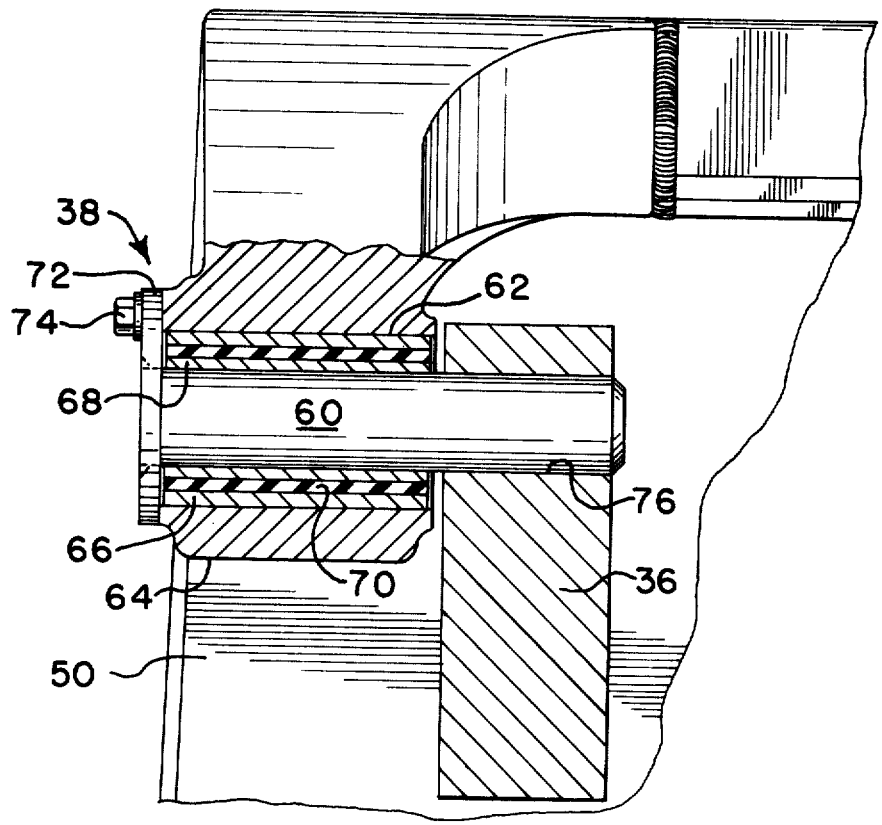
Fig_5_

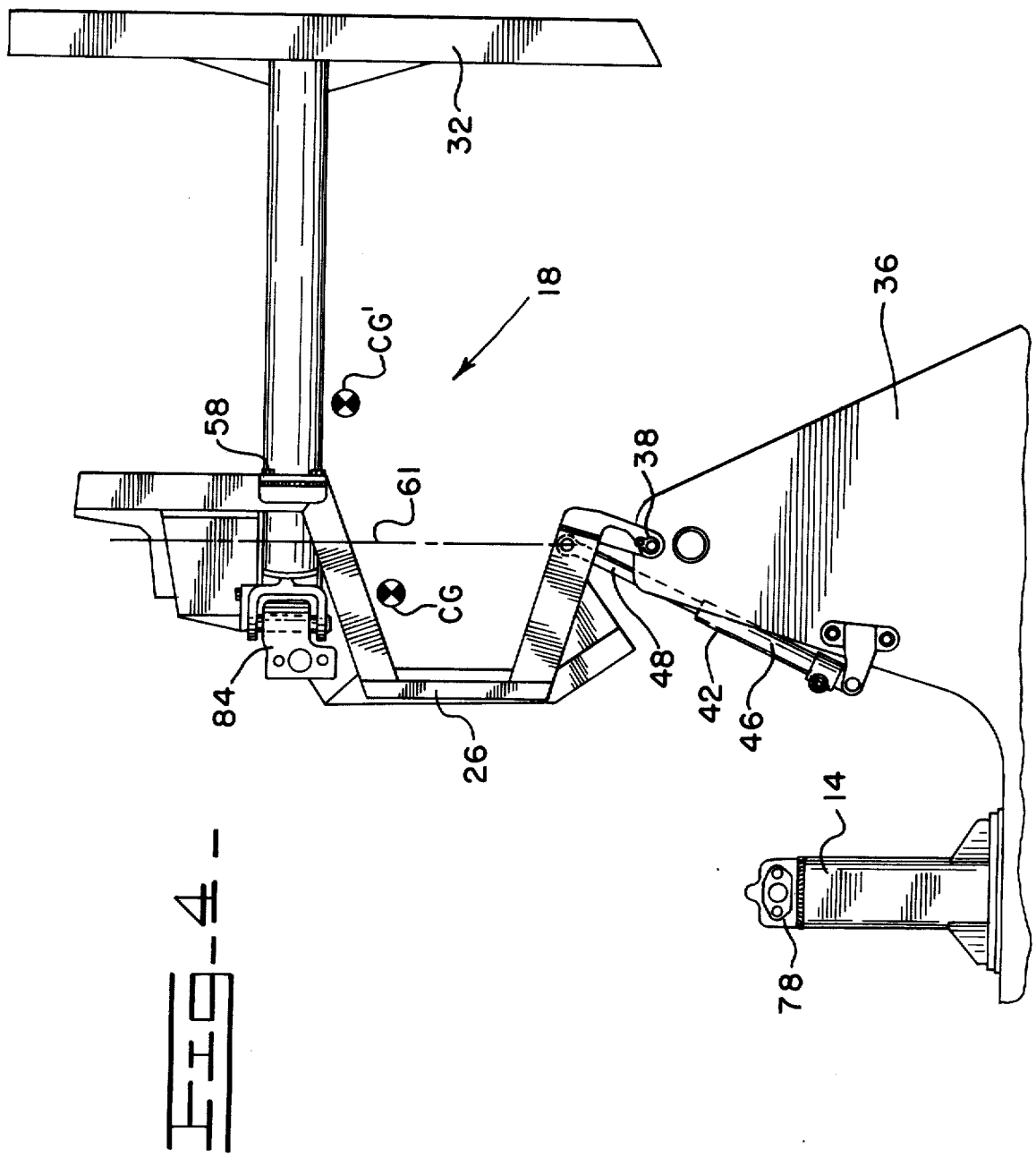

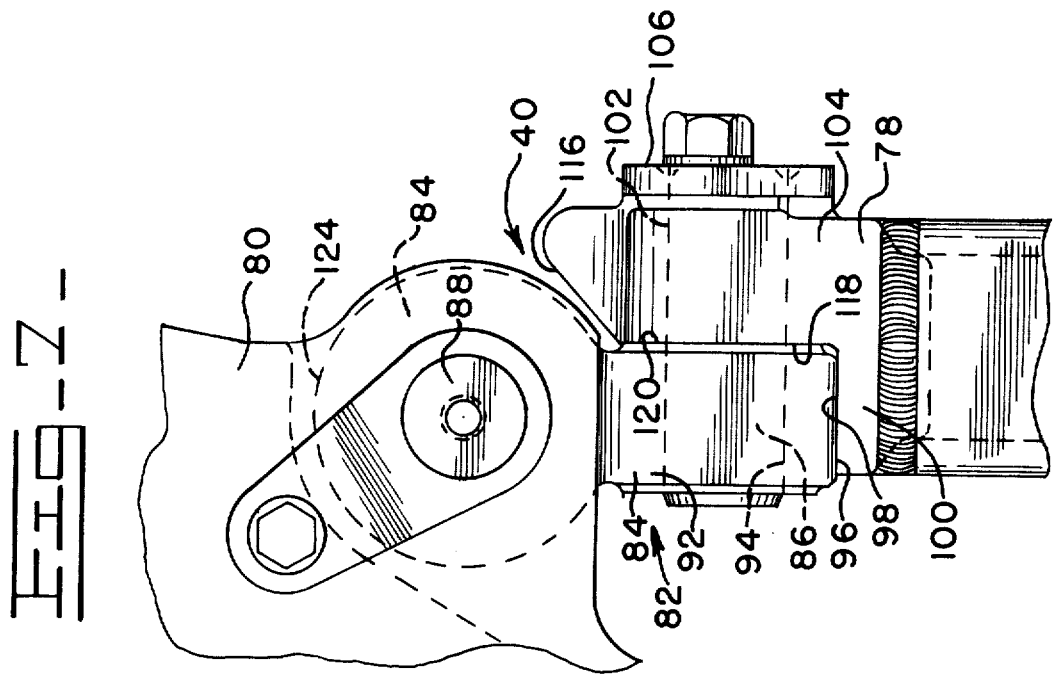
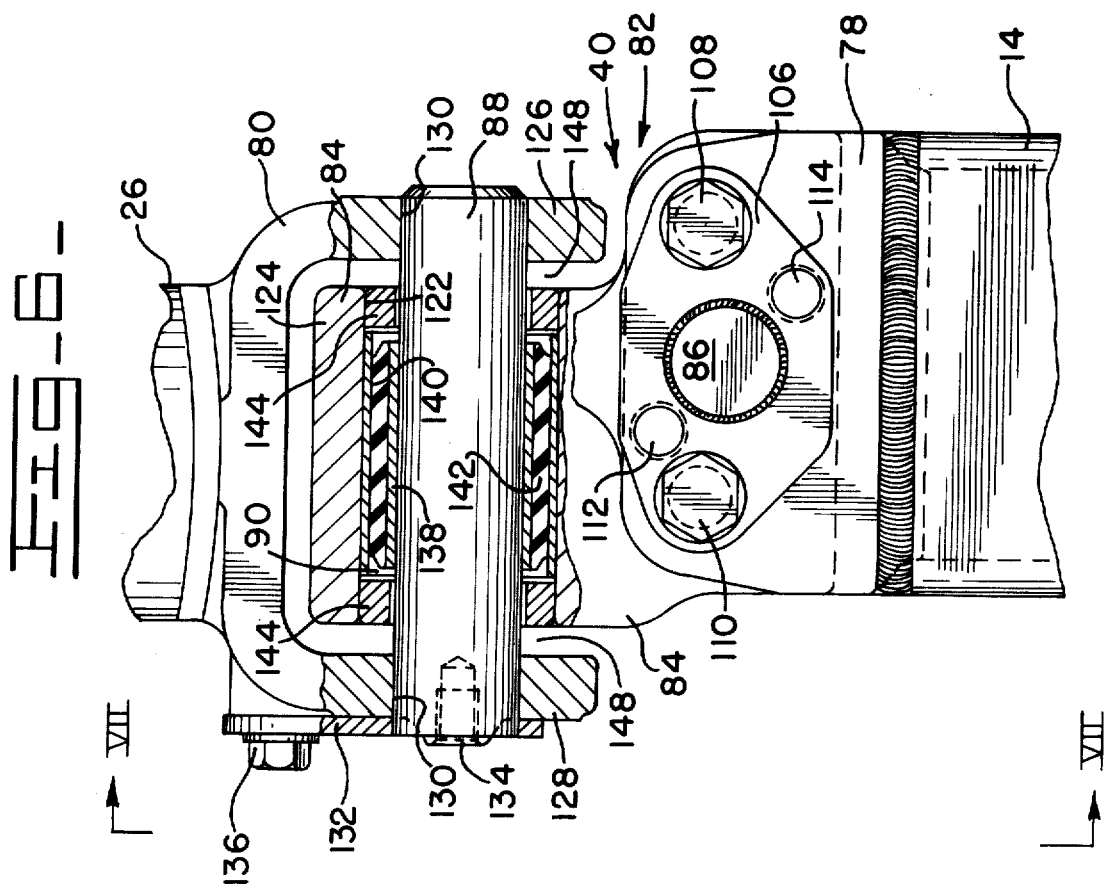

PLATFORM - OPERATOR TILTING RESILIENT MOUNTING FOR EARTHMOVING VEHICLES

BACKGROUND OF THE INVENTION

This invention relates to a resiliently and pivotally mounted operator's cab for an earth moving vehicle or the like.

Operators' cabs on earth moving vehicles are often pivotally mounted to the frame of the vehicle to facilitate raising the cab from a substantially horizontal operating position in which it overlies the vehicle components to a tilted maintenance position in which the vehicle components are exposed for maintenance work and repairs. To obtain a sufficient amount of exposure of the vehicle components, it is often necessary to tilt the cab past an overcenter position in which the center of gravity of the cab is located directly over the pivot axis.

It is of the utmost importance that means be provided to prevent accidental free fall of the cab on either side of the overcenter position once it has been raised. Such free fall of the cab can, of course, cause extensive damage both to the cab and to the other parts of the vehicle. More importantly, free fall of the cab into its horizontal operating position could, of course, grievously injure maintenance personnel.

Proposed solutions to this problem have included the use of hydraulic lift cylinders or the like for raising and lowering the cab which employ various devices to prevent loss of hydraulic pressure and thus cab support. For instance, in U.S. Pat. No. 3,875,850 issued Apr. 8, 1975, to Reynolds et al, the practice of employing a velocity fuse to prevent uncontrolled free fall of a load in the event of a hydraulic fluid system failure is described. However, as noted in that patent, such fuses, although provided as a safety feature, may themselves be unduly exposed to possible failure unless integrally mounted within the hydraulic lift cylinder itself. In U.S. Pat. No. 3,578,377 of Babbitt, Jr., et al, issued Jan. 13, 1969, to the assignee of the present invention, a hydraulic cylinder is employed with a built-in, double-holding valve to prevent free fall of the supported load in either direction.

In addition to providing means to prevent free fall of the cab, it is desirable to resiliently mount the cab to the vehicle frame to isolate it against frame vibrations occurring during vehicle operation. The use of resilient bushing assemblies to achieve this objective is shown in U.S. Pat. No. 3,572,819 issued Mar. 30, 1971, to Moore et al, U.S. Pat. No. 3,527,474 issued Sept. 8, 1970, to Boersma, U.S. Pat. No. 3,036,858 issued May 29, 1962, to Fingerut and, most recently, in U.S. Pat. No. 3,847,492 of Kennicutt et al issued Nov. 12, 1974, to the assignee of the present invention. Resilient bushing assemblies of this type include a pair of mating connectors respectively secured to the cab housing and the frame, and a removable pin or bolt extending through the two connectors and supporting the overlying connector and the weight of the cab through a resilient bushing therearound.

A serious disadvantage of this type of mounting is that the weight of the operator cab supported by the pin substantially impedes removal of the pin to decouple the cab from the frame. This characteristic is particularly disadvantageous in those applications where the cab is pivotally mounted and intended to be periodically raised and lowered for repairs.

SUMMARY OF THE INVENTION

In accordance with one feature of the present invention, a pivotally mounted cab is provided with a mechanical bearing force jack for raising and lowering the cab. The jack includes a pair of elongate members and means mechanically interconnecting the members to lock them against relative longitudinal movement when an adjusting force is not being applied thereto. In the preferred form of the pivotally mounted cab, the elongate members are threadably interconnected and thus in continuous bearing engagement with one another during the raising and lowering of the cab. The continuous bearing engagement inherently prevents free fall of the cab regardless of its location relative to the overcenter position.

In accordance with another feature of the present invention, the pivotally mounted cab is resiliently and releasably secured to the vehicle frame by means of an assembly which has the advantages of the resilient bushings of the prior art while overcoming the disadvantages of difficult pin removal. In keeping with this objective, a coupler having a rigid body is provided with means for releasably coupling the body to one of the first and second connectors fixedly secured to the frame and the cab housing, respectively, and separate means spaced from the releasable coupler for resiliently coupling the body to the other one of the first and second conectors. The resilient coupling thereby need not be disassembled to raise the operator cab. Preferably, the one connector releasably coupled to the body has a bearing surface which supports the rigid body, and thus the weight of the cab, in coupling alignment therewith for receipt of a removable pin. The coupling engagement of the removable pin with the rigid body and the first connector is thereby substantially nonsupportive, and the pin may be readily disengaged to allow separation of the cab and the frame. The releasable connector is of the resilient bushing type, and thus the entire assembly enjoys the inherent advantages thereof.

The foregoing advantages of the present invention will be made more apparent, and further features and advantages will be disclosed in the description of the preferred embodiment.

BRIEF DESCRIPTION OF THE DRAWING

The description of the preferred embodiment will be given with reference to the several views of the drawing, in which:

FIG. 2 is an enlarged side elevational view of a portion of the operator's cab illustrating the releasable securing assembly and jack in more detail;

FIG. 3 is another enlarged side elevational view of a portion of the loader of FIG. 1 illustrating the operator's cab in a tilted position;

FIG. 4 is another enlarged side elvational view of a portion of the loader illustrating the cab in a tilted position past an overcenter position;

FIG. 5 is an enlarged sectional view, taken along section line V—V of FIG. 2, illustrating one of two identical pivot mounts used to pivotally secure the cab to the loader frame;

FIG. 6 is an enlarged side view, partially in section, of the releasable mounting assembly; and FIG. 7 is a side elevational view of the releasable mounting assembly as seen when viewed in the direction of arrows VII—VII of FIG. 6.

DESCRIPTION OF THE PREFERRED EMBODIMENT

Figure 1:
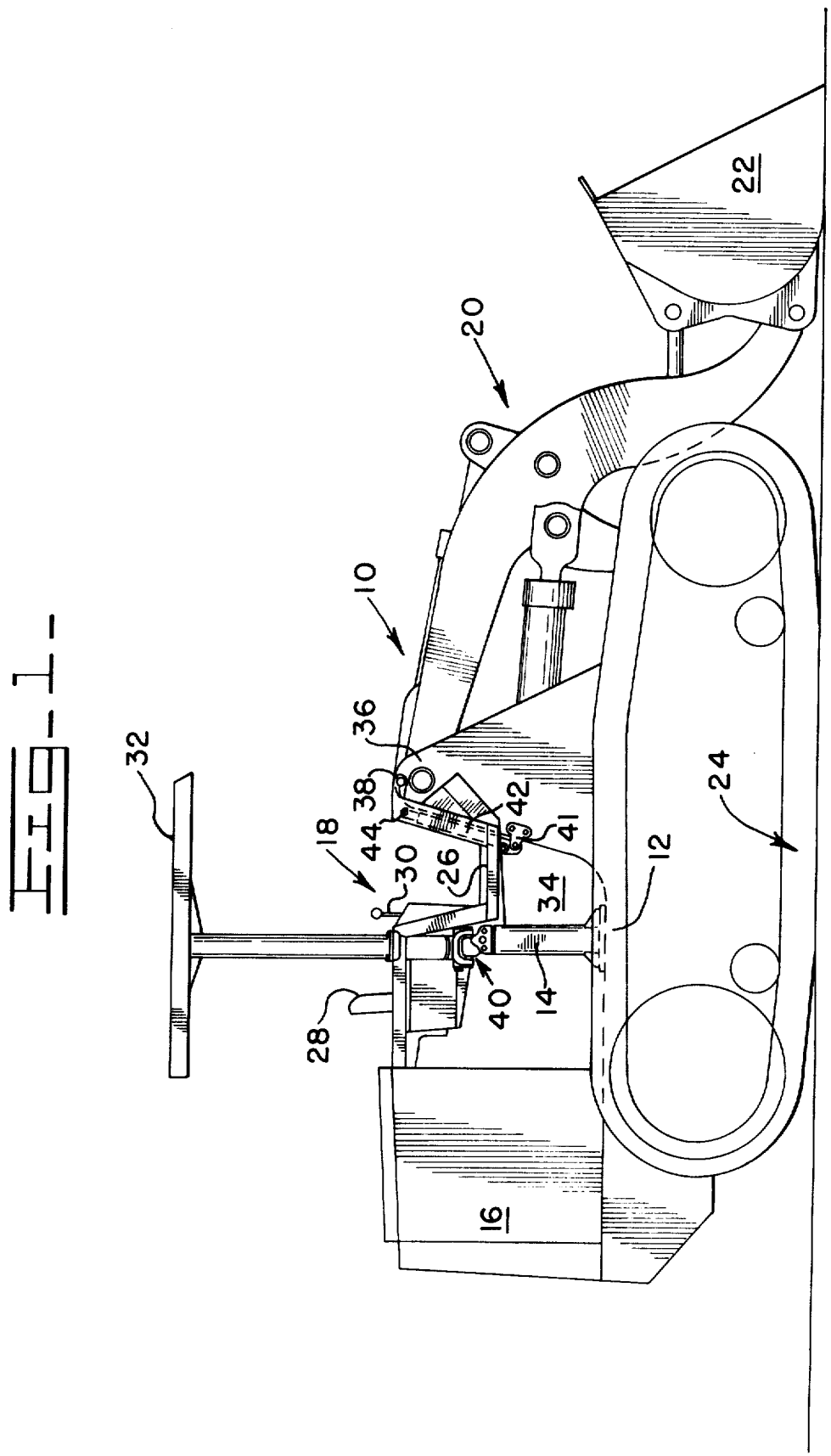
FIG. 1 is a side elevational view of a rear engine loader with an operator's cab employing the present invention.

As seen in FIG. 1, a rear engine loader 10 employing the invention includes a symmetrical frame 12 with a pair of frame elements or pedestals 14 symmetrically disposed on opposite sides of the elongate axis of the loader 10 (only one side shown). The loader also includes a power unit 16, an open operator's cab or station 18, a bucket linkage 20 and a bucket 22. The frame is supported upon an undercarriage and driven by a pair of endless track chains 24.

The cab 18 includes an operator's platform 26 with an operator's chair 28 adjacent control 30. Supported by platform 26 is a roll-over protection structure 32. Not shown, but located beneath platform 26 in the area indicated by reference numeral 34 between main frame elements 12 are a large number of hydraulic elements, circuitry and other vehicle components.

Accessibility to area 34 is necessary for maintenance and repair of the vehicle components thereat. Accordingly, the operator's cab or housing 18 is pivotally secured to a pair of legs 36 of frame 12 by means of a pair of pivot mounts 38. The rear portion of operator's cab 18 is supported on the pair of pedestals 14 by means of a pair of substantially identical releasable securing assemblies 40. A bearing force jack 42 mounted to leg 36 by a pivot mount 41 and to an arm 50 of platform 26 by a pivot mount 44 is provided to raise operator's cab 18 to gain access to the vehicle components at 34. One of pivot mounts 41 and 44 is maybe a resilient mount to prevent transmission through the jack 42 of vibrations generated in the frame 12.

In keeping with one of the objects of the present invention, jack 42 is a mechanical bearing force jack comprising a pair of elongate adjustable members 46 and 48. Members 46 and 48 are threadably interconnected intermediate pivot mounts 41 and 44 whereby a bearing force therebetween is applied to move member 48 along the length of member 46 in response to the application of an adjusting force to a rotatable member 52. A mechanical linkage (not shown) between rotatable member 52 and member 46 causes member 46 to rotate when a rotary adjusting force is applied to adjustment member 52. When the rotary adjusting force is applied to the jack, the cab 18 is pivoted upwardly, as illustrated in FIG. 3. Due to the bearing force between members 46 and 48, the cab is safely held in the pivoted position without the need for special controls or other safety precautions.

Preferably, member 46 has an external worm thread 54 along its length in threadable connection with an elongated worm gear 56 of elongate member 48. However, it should be appreciated that other adjustable members can be employed so long as they mechanically lock the members together against relative longitudinal movement when an adjusting force is not being applied thereto.

Referring to FIG. 4, the roll-over protection structure 32 is detachable from platform 26 by means of bolts 58 or the like. If the roll-over protection structure 32 is detached, the center of gravity CG of operator cab 18 is located between pedestal 14 and an overcenter position 61 directly above forward resilient pivot mount 38. In this instance, the weight of cab 18 applies a force to members 46 and 48 tending to move them together. With the roll-over protection structure 32 attached to platform 26, the center of gravity CG' is located on the side of pivot mount 38 opposite jack 42. In that case, the weight of the cab applies a force tending to move members 46 and 48 apart.

In prior art structures employing hydraulic jacks, only a single valve was utilized when the roll-over protection structure 32 is detached, while two valves were used to prevent free fall of the operator's cab 18 if the roll-over protection structure 32 is attached. The expense of one of the valves of a two-valve hydraulic lift control is wasted on cabs not having a roll-over protection structure. This disadvantage is overcome by the present invention in which the bearing force jack 12 has mating bearing surfaces which oppose forces tending to move members 46 and 48 relative to one another regardless of the direction of the force.

To maximize operator comfort and to minimize the application of stress forces to cab 18, it is necessary that vibration damping means be provided to prevent the application of such forces generated in the frame from being transmitted to the cab. Thus, both the front pivotal mounts 38 and the rear releasable securing assembly 40 resiliently mount the cab 18 to the frame 12.

Referring to FIG. 5, the front pivotal mount 38 is seen to include a pin member 60 extending through and resiliently held within a bore 64 of arm 50 by a resilient bushing assembly 62. The bushing assembly 62 includes an outer metallic cylindrical sleeve 66 in snug engagement with bore 64, an inner cylindrical metallic sleeve 68 in bearing engagement with pin 60 and a resilient cylindrical bushing 70 made from suitable elastomeric material sandwiched between metallic sleeves 66 and 68. The pin 60 is secured to a cover plate 72 which overlies the outer opening of bore 64 at the ends of sleeves 66 and 68 and bushing 70. Relative rotary motion of the pin 60 is prevented by means of a bolt 74 securing cover plate 72 to arm 50. The free end of pin 60 projects out of the inner opening of bore 64 and into pivotal bearing engagement with a bore 76 in frame section 36.

Turning to FIGS. 6 and 7, the releasable securing assembly 40 is seen to resiliently and releasably secure the operator's cab 18 to pedestal 14 of frame 12. Assembly 40 includes a first connector 78 fixedly secured to frame element 14, a second connector 80 fixedly secured to the cab platform 26, and a coupler 82 for releasably securing together the first and second connectors 78 and 80.

Coupler 82 includes a rigid body 84. Means including a removable coupling member or pin 86 releasably couples body 84 to the first connector 78. Means including a pin 88 and a resilient bushing 90 resiliently couples body 84 to the second connector 80. The resilient coupling means substantially isolates the second connector 80 and thus the operator platform 26 from vibrations generated within frame 12 and transmitted by the first connector 78. The releasable coupling means functions to releasably connect the platform 26 to the frame 12 so that the pin 88 need not be removed from the resilient bushing 90 to raise the operator cab 18.

Referring particularly to FIG. 7, rigid body 84 is seen to have a lower section 92 with a bore 94 therethrough for receiving removable pin 86 and a bottom surface 96 in supportive bearing engagement with the top surface 98 of a ledge 100 of first connector 78. Body 84 is thus supported by first connector 78 with its pin-receiving bore 94 in coupling alignment with a similar bore 102 extending through an upturned portion 104 of first connector 78. Pin 86 extending through bores 94 and 102 thus merely couples the body 84 and first connector 78 against forces tending to separate them and is substantially nonsupportive of the weight of operator cab 18.

Because pin 86 bears only a minimum load, if any load at all, it may be readily disengaged from within bores 102 and 94 to allow separation of the bearing surfaces 96 and 98. The pin 86 is fixedly secured to a removal plate 106. The removal plate 106, and thus pin 86, are secured against removal of the pin during operation of the vehicle by means of a pair of bolts 108 and 110 located on opposite sides of pin 86 and threaded into suitably tapped holes within first connector 78.

A second pair of tapped holes 112 and 114 within removal plate 106 are provided to faciltate removal of pin 86. When it is desired to remove the pin 86 from coupling engagement with the rigid body, a pair of bolts or other threaded members (not shown) are screwed into tapped holes 112 and 114. The threaded members, when secured to removal plate 106, function as handles through which pulling forces may be applied to pin 86. Alternately, pulling forces may be applied by the action of these bolts abutting against a vertical wall 120 of first connector 78 as the bolts are screwed through the tapped holes 112 and 114.

A further advantageous feature of the releasable securing assembly is the provision of a guide surface 116 which slopes upwardly from adjacent the bearing surface in the elongate direction of pin 86. The pivot axis of pivot mounts 38 may become slightly misaligned relative to the first connector 78. If so, the bearing surface 96 of body 84, upon contacting guide surface 116, will be guided thereby inwardly toward the elongate center axis of the vehicle and downwardly into supportive engagement with bearing surface 98 of first connector 78.

It is again noted that while only one is shown, two substantially identical releasable mounting assemblies 40 40 are provided. The two assemblies 40 are symmetrically disposed on opposite sides of the center elongate axis of the vehicle, and are mirror images of one another. Accordingly, a substantially vertical wall 118 extending from bearing surface 98 to guide surface 116 of the upturned portion 104 of each of first connectors 78 restrains the cab against lateral movement. Each wall 118 bears against a mating vertical wall 120 of the lower section 92 of the body 84 associated therewith. The rigidity of cab 18 and the vertical wall 118 of each of the assemblies 40 prevents the lower section 92 of the body 84 of the opposite assembly 40 from moving inwardly toward the center of the vehicle and thereby disengaging from its pin 86. Each of walls 118, of course, also prevents its associated lower section 92 from moving outwardly away from the center axis in the direction of its pin 86 and the pivot axis of the cab.

Referring still to FIGS. 6 and 7, the resilient coupling means, in addition to pin 88 and resilient bushing 90, includes a bore 122 extending through an upper section 124 of body 84 in a direction substantially transverse to the elongate direction of pin 86 and the pivot axis of pivot mount 38. Second connector 80 is preferably a cleavis with a pair of spaced cleavis arms 126 and 128 located on opposite sides of upper section 124 of the rigid body. A pair of aligned holes 130 are respectively located in arms 126 and 128. The pin extends through holes 130 and through the center of resilient bushing 90 and thus bears the weight of cab 18. Pin 88 is secured to a plate 132 by means of a screw 134. Plate 132, in turn, is secured to the second connector 80 by means of a bolt 136.

Resilient bushing 90, like the resilient bushing of the pivotal mounts 38, includes inner and outer metallic sleeves 138 and 140 and a resilient, rubber-like bushing 142 sandwiched therebetween to absorb vibrations. The resilient bushing 90 is contained within bore 122 by a pair of retaining rings 144 secured within bore 122 at opposite ends thereof. The upper section 124 is dimensioned relative to the spacing between arms 126 and 128 to provide lateral spaces 148 therebetween. The upper section 124, while connected against relative movement in a radial direction with respect to pin 88, is slidably coupled therewith for slight relative movement in the direction of the pin. Permitting this slight amount of movement reduces strain applied to operator cab 18, while the radial restraint securely holds the cab against longitudinal movement.

We claim:

1. In a vehicle having a frame, an operator cab overlying the frame, and vehicle components underlying the cab when the cab is in an operating position relative to the frame, apparatus for moving the operator cab upward away from the frame to a maintenance position wherein the vehicle components are exposed, comprising:

means for mounting the cab to the frame for pivotal movement relative thereto about an axis adjacent one side of the cab; and jack means for mechanically altering the pivotal position of the cab relative to the frame when an adjusting force is applied thereto, said jack means including a pair of elongate members connected respectively to the frame and the cab spaced from the axis, said members being aligned in telescoping relation for relative longitudinal movement, and means interconnecting the members for applying a moving force therebetween to move the cab-connected member along the length of the frame-connected member in response to said adjusting force and for applying a frictional locking force between said members to frictionally lock said members against relative longitudinal movement whenever said adjusting force is not being applied, said members being adjustable to pivot the cab to a maintenance position in which the center of gravity thereof is located on a side of the pivot axis whereat the weight of the cab applies a force to move said pair of elongate members apart, and said interconnecting means applies a bearing force which opposes the force of the cab weight.

2. An assembly for mounting a housing to the frame of a vehicle, comprising:

a first connector fixedly secured to the frame;

a second connector fixedly secured to the housing; and a coupler for releasably securing together the first and second connectors, said coupler including a body with a rigid bearing surface at one end thereof for bearing engagement with one of the first and second connectors, means adjacent the one end of the body for releasably coupling the body with the one of said first and second connectors including an elongate coupling member extending in a single direction through both the body and the one connector, and means for withdrawing the coupling member in its elongate direction therefrom, and means spaced from the coupling member for resiliently coupling the body to the other of said first and second connectors, said resilient coupling means substantially isolating the other connector and housing from frame vibrations.

3. The assembly of claim 2 in which said releasably coupling means couples the body to the first connector, and the resilient coupling means couples the body to the second connector, and said bearing surface underlies the coupling member.

4. The assembly of claim 2 in which said housing overlies the frame and is supported thereabove by the rigid body of the coupler, and said rigid body and the one connector releasably connected therewith have respective mating surfaces in supportive engagement with one another.

5. The assembly of claim 4 in which said one connector is the first connector, said rigid body being supported by the bearing surface thereof.

6. The assembly of claim 4 in which said removable coupling member is in substantially nonsupportive coupling engagement with both the rigid body and the one connector, said coupling member opposing separation of said respective mating surfaces.

7. The assembly of claim 4 wherein the rigid body and the one connector are in coupling alignment when the respective mating surfaces thereof are in supportive engagement with one another, and one of said rigid body and said one connector includes a guide surface projecting upwardly from the mating surface to guide the other of said rigid body and said one connector into coupling alignment therewith.

8. The assembly of claim 7 in which said housing is mounted for pivotal movement relative to the frame about an axis spaced from the assembly, and said guide surface slopes upwardly from adjacent the supportive bearing surface in a direction substantially parallel to the pivot axis.

9. An assembly for mounting a housing to the frame of a vehicle, comprising:

a first connector fixedly secured to the frame;

a second connector fixedly secured to the housing; and a coupler for releasably securing together the first and second connectors, said coupler including a body with a rigid bearing surface at at one end thereof for bearing engagement with one of the first and second connectors, means adjacent the one end of the body for releasably coupling the body with the one of said first and second connectors including an elongate coupling member extending in a single direction through both the body and the one connector, and means for withdrawing the coupling member in its elongate direction therefrom, and means spaced from the coupling member for resiliently coupling the body to the other of said first and second connectors, said resilient coupling means substantially isolating the other connector and housing from frame vibrations;

said housing overlying said frame and supported thereabove by the rigid body of the coupler, said rigid body and the one connector releasably connected therewith having respective mating surfaces in supportive engagement with one another;

said releasable coupling being in substantially nonsupportive coupling engagement with both the rigid body and the one connector, said coupling member opposing separation of said respective mating surfaces;

said removable coupling member being a pin extending into and in removable engagement with the rigid body and the one connector, the nonsupportive engagement of said pin with the rigid body and the one connector enabling easy removal thereof, removal of said pin allowing separation of the mating surfaces.

10. An assembly for mounting a housing to the frame of a vehicle, comprising:

a first connector fixedly secured to the frame;

a second connector fixedly secured to the housing; and a coupler for releasably securing together the first and second connectors, said coupler including a body with a rigid bearing surface at one end thereof for bearing engagement with one of the first and second connectors, means adjacent the one end of the body for releasably coupling the body with the one of said first and second connectors including an elongate coupling member extending in a single direction through both the body and the one connector, and means for withdrawing the coupling member in its elongate direction therefrom, and means spaced from the coupling member for resiliently coupling the body to the other of said first and second connectors, said resilient coupling means substantially isolating the other connector and housing from frame vibrations;

said resilient coupling means including an elongate post in coupling engagement with the rigid body and the other connector and extending in a direction substantially transverse to the pivot axis, said post coupling the rigid body and other connector against relative movement in a radial direction with respect to the post and slidably coupling the rigid body and the other connector for relative movement therebetween in the elongate direction of the post, and said releasably coupling means includes an elongate pin in coupling engagement with the rigid body and the one connector, said pin extending in a direction substantially transverse to the elongate direction of the post.

* * * * *